(12) United States Patent  
Allingham et al.

(10) Patent No.: US 9,309,630 B2  
(45) Date of Patent: Apr. 12, 2016

(54) ARTIFICIAL SPORTS SURFACE

(71) Applicant: Alltex Specialty Products Pty Ltd, Nelson Bay, New South Wales (AU)

(72) Inventors: Paul Allingham, Nelson Bay (AU); Graeme Clark, Bairnsdale (AU)

(73) Assignee: Alltex Specialty Products Pty Ltd, Nelson Bay, New South Wales (AU)

( * ) Notice: Subject to any disclaimer, the term of this patent is extended or adjusted under 35 U.S.C. 154(b) by 0 days.

(21) Appl. No.: 14/425,091

(22) PCT Filed: Aug. 30, 2013

(86) PCT No.: PCT/AU2013/000966  
§ 371 (c)(1),  
(2) Date: Mar. 2, 2015

(87) PCT Pub. No.: WO2014/032102  
PCT Pub. Date: Mar. 6, 2014

(65) Prior Publication Data  
US 2015/0247293 A1    Sep. 3, 2015

(30) Foreign Application Priority Data

Aug. 30, 2012    (AU) ................. 2012216554

(51) Int. Cl.  
*E01C 13/08*    (2006.01)  
*A63C 19/04*    (2006.01)  
(Continued)

(52) U.S. Cl.  
CPC ............... *E01C 13/08* (2013.01); *A63C 19/04* (2013.01); *B32B 5/022* (2013.01); *B32B 5/028* (2013.01);  
(Continued)

(58) Field of Classification Search  
CPC ......... E01C 13/00; E01C 13/02; E01C 13/08; E01C 13/045; E01C 13/065; A63C 19/00; A63C 19/04  
USPC ............ 472/85–87, 92, 94; 405/302.4, 302.7; 428/92  
See application file for complete search history.

(56) References Cited

U.S. PATENT DOCUMENTS 3,740,303 A    6/1973    Alderson et al.  
4,705,706 A    11/1987    Avery  
(Continued)

FOREIGN PATENT DOCUMENTS

CN    201713744 U    1/2011  
EP    1705292 A1    9/2006  
GB    2308569 A    7/1997

OTHER PUBLICATIONS

International Search Report for PCT/AU2013/000966 dated Nov. 13, 2013 (5 pages).  
(Continued)

*Primary Examiner* — Kien Nguyen  
(74) *Attorney, Agent, or Firm* — Michael Best & Friedrich LLP

(57) ABSTRACT

A synthetic turf sports flooring product with a performance surface upon which sports can be played. The flooring product is formed from polymer fibers entangled to provide a sports surface layer which provides the performance surface, and substantially all of the polymer fibers of the sports surface layer are locked in position relative to the synthetic turf sports flooring product as a whole by the arrangement of fibers and contact between fibers in the mat. The fibers may be locked in position by entanglement, surface friction between fibers and/or inherent bonding of fibers in the synthetic turf sports flooring product. The product can provide a predictable playing surface which changes little with varying moisture and temperature changes during play, at least in part by avoiding the use of bonding chemicals in its structure. An underlay material of similar construction can be used in conjunction with the playing surface.

19 Claims, 5 Drawing Sheets

(51) Int. Cl.
  *E01C 13/02* (2006.01)
  *B32B 5/06* (2006.01)
  *B32B 5/26* (2006.01)
  *B32B 5/02* (2006.01)
  *D04H 1/46* (2012.01)
  *D04H 1/485* (2012.01)
  *D04H 1/54* (2012.01)

(52) U.S. Cl.
  CPC ... *B32B 5/06* (2013.01); *B32B 5/26* (2013.01); *D04H 1/46* (2013.01); *D04H 1/485* (2013.01); *D04H 1/54* (2013.01); *E01C 13/02* (2013.01); *B32B 2471/00* (2013.01)

(56) References Cited

U.S. PATENT DOCUMENTS

| 6,877,932 B2* | 4/2005 | Prevost | E01C 13/08 |
| | | | 405/302.7 |
| 7,758,281 B2 | 7/2010 | Knox | |
| 7,874,320 B2* | 1/2011 | Knapp | D03D 27/00 |
| | | | 139/21 |
| 2006/0093783 A1* | 5/2006 | De Clerck | E01C 13/08 |
| | | | 428/92 |

OTHER PUBLICATIONS

International Preliminary Report on Patentability for PCT/AU2013/000966 dated Aug. 1, 2014 (4 pages).

* cited by examiner

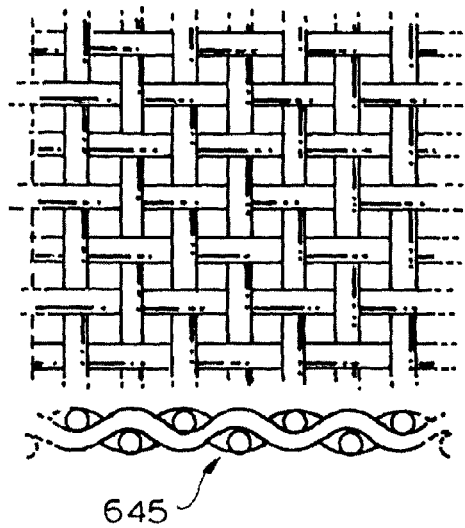
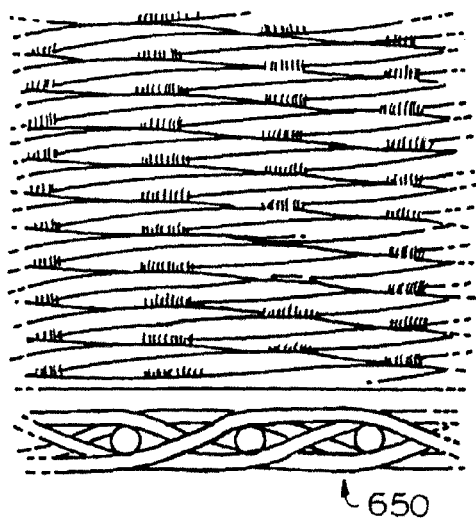
FIG.7A　　　　　　FIG.7B
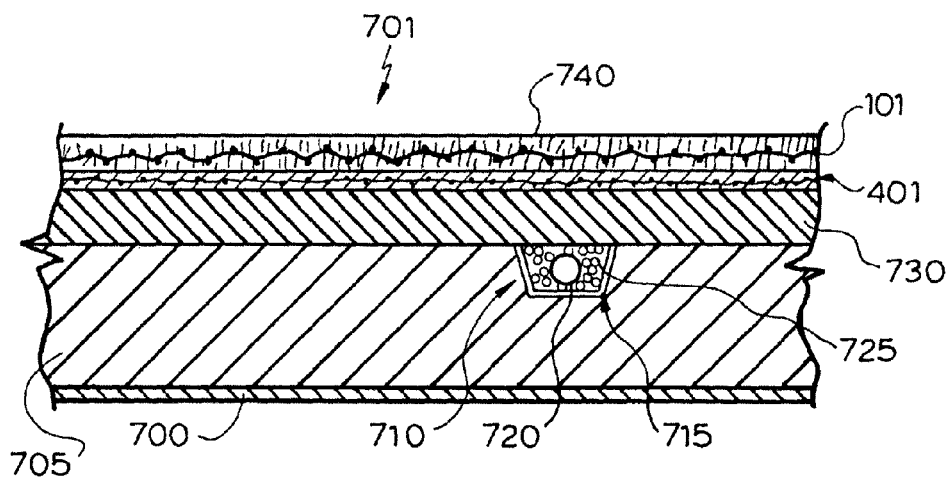
FIG.8

ARTIFICIAL SPORTS SURFACE

FIELD

The present disclosure relates to synthetic sports playing surfaces.

BACKGROUND

Artificial turf sports playing surfaces are becoming increasingly popular as a replacement for natural grass in stadiums, on golf courses, play ground areas and on sports playing fields. Artificial turf sports playing surfaces require less maintenance than grass surfaces, and do not require water, chemicals or sunlight for satisfactory performance and sustainability. The environmental impact of artificial sports surfaces is considered less than that of an equivalent grass sports surface, not least because of reduced water and maintenance requirements. The versatility of synthetic turf allows it to be placed in totally dry regions, regions of high rainfall, extreme heat conditions and cold regions. It requires no sunlight and can be laid indoors. It can even be made to be portable; laid and removed as and when needed for use.

Most synthetic grass materials are comprised of rows of grass-like polymer flat ribbons, strips, twisted yarns, fibrillated yarns, texturised yarns and like forms that are tufted and bonded into a synthetic backing material. Polypropylene and polyethelene polymers are almost always used. The polymer ribbons or strands stand vertically into the backing media, then fine granulated or ground particulate materials such as sand, polymer granules, ground or granulated rubber, polymer foam etc. are in-filled between the synthetic ribbons to support the vertical oriented ribbons and also provide impact cushioning for player comfort and safety where needed.

The synthetic ribbons for example are inserted into the backing media normally by a tufting process. The backing media is then normally coated or covered by a bonding compound to prevent removal of the polymer ribbons from the backing material. The polymer ribbons act like grass and usually extend above the level of granular infill so that the ribbons simulate the aesthetic characteristics, and to some degree behaviour, of natural grass. The length of the ribbons above the infill surface is provided according to the end use of the playing surface. By way of example, longer pile lengths are desirable for football and baseball fields compared to shorter pile lengths required for tennis, golf and bowls.

Compared to football, American football and rugby, games such as tennis, croquet, hoop ball, golf and bowls require a playing surface which provides greater ball roll precision and predictability. Greater ball roll precision and predictability enhances the effect of differing skill levels of the players. Within these latter sports, the smaller ball size and degree of contact of the ball with the playing surface also require consistent and predictable rolling speed and directional stability. Currently, synthetic playing surfaces using in-fill technology are commonly used, however, the non-uniformity of the synthetic sports surface and the infill materials negatively impact upon the predictability of the rolling speed and directional stability of the ball. Artificial surfaces using infill also require considerable maintenance to achieve a reasonable degree of playing consistency. Also, importantly, artificial surface using infill may have a significant negative impact on the play of a competitive game because the artificial surface may adversely affect the roll of the ball compared to a natural turf surface.

Still other versions of prior art artificial grass have been developed using non-tufting technology. This design development has successfully eliminated the need for in-fill materials; however, the technology still relies upon traditional polymeric make-up of the artificial grass such as polypropylene and polyethylene and chemical binders or bonding solutions to provide the integrity of the synthetic grass surface. While this material make-up and construction provides some improvement over in-fill technology, such surfaces are susceptible to negative influences due to minor climatic change. The games for targeted use are normally played outdoors, where climatic conditions may vary minute by minute, so it is undesirable for such variations to greatly influence the performance of the synthetic surface. Use of a playing surface with characteristics which change rapidly during play reduces predictability and increases the extent to which player competition is left to chance, which is highly undesirable.

The present inventors have discerned that polymers and chemical binding solutions used in non-infill artificial playing surfaces can rapidly change in hardness when exposed to variable temperatures from direct sunlight to shaded zones. This thermal change affects the hardness properties of the synthetic playing surface, ball friction and ball tracking characteristics. Also, polyolefin polymers, such as polypropylene and polyethylene fibres are used as the synthetic sport surface in contact with the ball or within the fibre matrix. These polymers generally become soft with heat which changes the friction properties between the ball and the synthetic surface. By way of example, ball speed in areas of such a synthetic surface that are exposed to direct sunlight may be slower compared to areas on the same synthetic playing surface that are in shade. These polymers and polymer binders react quickly to thermal changes, meaning the ball speed can change rapidly, making luck or chance an increased factor in game results. Still further complexities are introduced by moisture, whereby rain, water seepage, dew etc is adsorbed into the synthetic fibre matrix and polymer binders, resulting in different playing characteristics in different regions of the artificial playing surface and at different times during a game.

It is, therefore, highly desirable to produce an artificial grass playing surface having improved resistance to climatic influence, thus, allowing for greater opportunity for player skill to determine the outcome of competition, particularly at professional and international competition playing levels. These improvements are required for many types of sport playing surfaces including, but not limited to golf and bowls where predictability of ball speed and line of direction are paramount. Simulation or replication of the properties of natural grass is one of the objectives for performance based synthetic sports surfaces and a high degree of predictability is the desired outcome.

It would be desirable for at least embodiments in accordance with the present disclosure to overcome one or more of these disadvantages, or at least to provide a useful alternative.

SUMMARY

According to a first aspect of the present disclosure there is provided a synthetic turf sports flooring product with a performance surface upon which sports can be played, the synthetic turf sports flooring product comprising a plurality of polymer fibres entangled to provide a sports surface layer which provides the performance surface, wherein substantially all of the polymer fibres of the sports surface layer are locked in position relative to the synthetic turf sports flooring product as a whole by the arrangement of fibres and contact between fibres in the synthetic turf sports flooring product.

In an embodiment no additional binders or adhesives are used to lock the polymer fibres of the sports surface layer in position relative to the synthetic turf sports flooring product as a whole.

For clarity it is stated that, in this context, "additional binders or adhesives' denotes binders or adhesives which are not part of, or inherent in, the fibres which constitute the sports flooring product.

The arrangement and contact of the fibres may lock the fibres in position by mechanisms comprising physical entangling of the fibres, friction between fibres and/or inherent bonding of fibres.

For clarity it is stated that "inherent bonding of fibres" denotes bonding which relies upon the properties of the fibres, rather than on additional bonding or binding materials. Thus adhesion between fibres may be regarded as being by inherent bonding if they adhere due to a heat (and/or pressure) treatment which allows them to adhere together due to the properties of the fibres, but should not be regarded as being bonded by inherent bonding of the fibres if they are adhered by a resin or other bonding material which is not part of the fibres. It should be regarded that contact between fibres is intended to include contact at regions where fibres are fused or welded together, so that fused or welded (but still distinguishable) fibres are considered to have contact therebetween.

In an embodiment the structural integrity of the synthetic turf sports flooring product is provided substantially entirely by the arrangement of fibres and contact between fibres in the synthetic turf sports flooring product.

In an embodiment the structural integrity of the synthetic turf sports flooring product is provided substantially entirely by the arrangement of fibres, surface friction between fibres and/or inherent bonding of fibres in the synthetic turf sports flooring product.

This can allow provision of a synthetic turf sports flooring product free from additional binding agents and adhesives.

In an embodiment at least some of the polymer fibres are configured to project outwardly of the sports surface layer.

In an embodiment some or all of the polymer fibres which project outwardly of the sports surface layer are arranged so that each provides at least one free end which projects outwardly of the sports surface layer.

In an embodiment some or all of the polymer fibres which project outwardly of the sports surface layer are arranged so that each provides at least one loop portion which projects outwardly of the sports surface layer. Each of the polymer fibres which provide a loop portion which projects outwardly of the sheet may have both ends thereof entangled with other polymer fibres in the sheet.

In an embodiment parts of the fibres which project outwardly of the sports surface layer may be regarded as simulating turf.

In an embodiment at least some of the fibres which project outwardly of the sports surface layer may be non-circular in cross section.

In an embodiment at least some of the fibres which project outwardly of the sports surface layer may be ribbon-like or blade-like in form.

In an embodiment at least some of the fibres which project outwardly of the sports surface layer may be fibrillated fibres.

In an embodiment at least some of the polymer fibres are entangled with a scrim.

In an embodiment the scrim may be regarded as part of the sports surface layer. In an alternative embodiment the scrim may be regarded as layer which is not part of the sports surface layer. In an embodiments in which the scrim may be regarded as layer which is not part of the sports surface layer, polymer fibres of the sports surface layer may nonetheless be entangled with the scrim.

The scrim may be a woven sheet of material. The scrim may be a sheet of non-woven material. The scrim may be formed prior to entanglement with the polymer fibres. The scrim may be formed during entanglement with the polymer fibres. At least some of the polymer fibres may extend through the scrim. The synthetic turf sports flooring product may include more than one scrim layer.

In an embodiment the sports surface layer does not include a scrim. In an embodiment none of the polymer fibres of the sports surface layer are entangled with a scrim.

In an embodiment the sports surface layer has a mass per unit area of between 50 grams and 400 grams per square meter.

In an embodiment the sports surface layer has a mass per unit area of between 50 grams and 2000 grams per square meter.

In an embodiment, at least some of the fibres which project outwardly of the sports surface layer are "circular" in cross-section.

In an embodiment, at least some of the fibres which project outwardly of the sports surface layer are "irregular" in cross-section.

In an embodiment the synthetic turf sports flooring product has a mass per unit area of between 50 grams and 400 grams per square meter.

In an embodiment the synthetic turf sports flooring product has a mass per unit area of between 50 grams and 5000 grams per square meter.

In an embodiment at least some of the polymer fibres are formed of a polymer which has a glass transition temperature of at least 40 degrees centigrade.

In an embodiment at least some of the polymer fibres are formed of a polymer which has a glass transition temperature of at least 50 degrees centigrade.

In an embodiment at least some of the polymer fibres are formed of a polymer which has a glass transition temperature of at least 60 degrees centigrade.

In an embodiment at least some of the polymer fibres are formed of a polymer which has a glass transition temperature of at least 67 degrees centigrade.

In an embodiment, at least some of the fibres are formed of a material which has a glass transition temperature of at least 110 degrees centigrade.

In an embodiment at least some of the polymer fibres are formed of a polymer which is substantially non-adsorbent and/or non-absorbent of moisture.

In an embodiment at least some of the polymer fibres are formed of polyester.

In an embodiment substantially all of the polymer fibres are formed of polyester.

In an embodiment some of the polymer fibres are made from a polymer having different characteristics to a polymer of which some other polymer fibres are made. In an embodiment some of the polymer fibres are made from high shrinkage polyester. In an embodiment some of the polymer fibres are made from bi-component polyester. In an embodiment some of the polymer fibres are made from low melting point polyester. In an embodiment at least some of the polymer fibres are made from modified polyester to enhance the ultra-violet resistance of the polyester fibres. In an embodiment at least some of the polymer fibres are made from modified polyester and alloys of polyester.

In an embodiment, at least some of the fibres are modified to enhance the ultra violet resistance properties.

In an embodiment, at least some of the fibres are modified to enhance the colour fastness properties.

In an embodiment some of the polymer fibres have different cross sectional sizes to some other polymer fibres.

In an embodiment, at least some of the fibres have the same or similar sizes to the other fibres.

In an embodiment some of the polymer fibres have different cross sectional shapes to some other polymer fibres.

In an embodiment, at least some of the fibres have the same or similar cross sectional shapes to other fibres.

In an embodiment at least some of the polymer fibres have a length between 38 and 110 mm. In an embodiment at least most of the polymer fibres have a length between 38 and 110 mm.

In an embodiment at least some of the polymer fibres have a length between 70 and 100 mm. In an embodiment at least most of the polymer fibres have a length between 70 and 100 mm.

In an embodiment, none of the fibres are fibrillated. In an embodiment at least some of the polymer fibres are fibrillated. In an embodiment at least most of the polymer fibres are fibrillated.

In an embodiment, all of the fibres have the same or similar characteristics to at least one other in each layer.

In an embodiment at least some of the polymer fibres are coloured green or blue. In an embodiment at least most of the polymer fibres are coloured green or blue. Alternate coloured fibres and colour blends may be used, if desired.

In an embodiment the synthetic turf sports flooring product comprises a sports surface layer on each side of thereof. This allows the synthetic turf sports flooring to be reversed when a first performance surface has suffered wear, to expose a second performance surface.

In an embodiment the synthetic turf sports flooring product comprises a plurality of layers of non-woven sheet material.

In an embodiment the synthetic turf sports flooring comprises between two and ten layers of non-woven sheet material.

In an embodiment the synthetic turf sports flooring comprises between three and ten layers of non-woven sheet material.

In an embodiment the synthetic turf sports flooring comprises at least four layers of non-woven sheet material.

It will be appreciated that the synthetic turf sports flooring may comprise 1, 2, 3, 4, 5, 6, 7, 8, 9, 10, or more layers of non-woven sheet material.

In an embodiment at least one of the layers has at least one characteristic different to at least one other layer.

Characteristics that may differ between different layers include one or more of: mass per unit area, polymer fibre length, polymer fibre cross sectional size, polymer fibre cross sectional shape, polymer fibre tenacity, polymer fibre crimp, proportions of polymer fibres of different polymer types, polymer fibre composition (including but not limited to the polymer used and/or types and amounts of additives to provide desirable characteristics), resistance to ultraviolet radiation, colour, resilience (meaning springiness), sheet orientation (e.g. top up or bottom up, where top and bottom refer to the sides of the sheets when manufactured in a substantially horizontal configuration), sheet thickness, degree of entanglement of the polymer fibres; use, or non-use, of one or more scrims.

In an embodiment in which the synthetic turf sports flooring product comprises a plurality of layers of non-woven sheet material, the layers of non-woven sheet material may be mutually attached.

The layers of non-woven sheet material may be mutually attached by entanglement of fibres of different layers.

The layers of non-woven sheet material may be mutually attached by entanglement of fibres of different layers using needle punch technology and like technology.

The layers of non-woven sheet material may be mutually attached by entanglement of fibres of different layers using hydro-entanglement technology and like technology.

The layers of non-woven sheet material may be mutually attached by entanglement of fibres of different layers using air laid technology and like technology.

The layers of non-woven sheet material may be mutually attached by entanglement of fibres of different layers using spun bonded technology and like technology.

The layers of non-woven sheet material may be mutually attached by a process including heating.

The layers of non-woven sheet material may be mutually attached by a process including application of pressure.

The layers of non-woven sheet material may be mutually attached by a process including calendaring.

Manufacturing methods and technology of the surface and underlay may be substantially the same.

Manufacturing methods and technology of the surface and underlay may differ.

The layers of non-woven sheet material may be mutually attached without use of adhesives or bonding agents extrinsic to the polymer fibres.

The sports surface layer may be adapted to be used without use of in-fill.

The sports surface layer may be configured with performance surface characteristics which provide predictable interaction with an object which rolls or bounces on the performance surface during play of a sport or game. Examples of such rolling and/or bouncing objects include balls and bowls.

The sports surface layer may be configured with performance surface characteristics which correspond to those of conventional bowls playing surfaces.

The sports surface layer may be configured with performance surface characteristics which correspond to those of conventional golf greens.

The sports surface layer may be configured with performance surface characteristics which correspond to those of: conventional croquet playing surfaces; conventional hockey playing surfaces; conventional hoop-ball playing surfaces; conventional football playing surfaces; or conventional tennis playing surfaces.

The sports surface layer may be configured with performance surface characteristics which correspond to playing surface characteristics of other types of playing surface.

The sports flooring may further comprise, or be used in conjunction with, an underlay.

The underlay may be in accordance with the second aspect.

The underlay may have any one or more of the features or characteristics set out above in relation to the synthetic turf sports flooring product. In relating features or characteristics of the synthetic turf sports flooring product to the underlay it should be appreciated that the sports surface layer of the synthetic turf sports flooring product may be taken as corresponding to an outer underlay layer of the underlay. In relating features or characteristics of the of the sports surface layer to the outer underlay layer it should be appreciated that the performance surface of the sports surface layer may be taken as corresponding to a support surface of the outer underlay layer, which provides a support surface for supporting synthetic turf upon which sports can be played.

According to a second aspect of the present disclosure there is provided an underlay for a synthetic turf sports flooring, the underlay comprising an outer underlay layer having a side which provides a support surface for supporting synthetic turf upon which sports can be played, the outer underlay layer comprising a plurality of polymer fibres entangled to provide the support surface, wherein substantially all of the polymer fibres of the outer underlay layer are locked in position relative to the underlay as a whole by the arrangement of fibres and contact between fibres in the underlay.

In embodiments the outer underlay layer may have any one or more of the features or characteristics set out above in relation to the sports surface layer introduced in the first aspect. In relating features or characteristics of the sports surface layer to the outer underlay layer it should be appreciated that the performance surface of the sports surface layer may be taken as corresponding to the support surface of the outer underlay layer. In relating features or characteristics of the of the synthetic turf sports flooring product to the underlay it should be appreciated that the sports surface layer of the synthetic turf sports flooring may be taken as corresponding to the outer underlay layer of the underlay.

According to a third aspect of the present disclosure there is provided a method of manufacturing a mat for synthetic turf sports flooring, the method comprising manufacturing a performance surface layer having at least one side which provides a performance surface, the manufacture of the performance surface layer comprising: providing a plurality of polymer fibres in a layer; treating the layer of polymer fibres using a fibre entangling process to provide a sheet of entangled polymer fibres wherein substantially all of the polymer fibres of the performance surface layer are locked in position relative to the mat as a whole by the arrangement of fibres and contact between fibres in the mat.

In an embodiment at least some of the polymer fibres are orientated to project outwardly of the performance surface layer.

In an embodiment the mat is synthetic turf sports flooring and the performance surface is an artificial turf surface upon which sports can be played.

In an embodiment the mat is an underlay for an artificial sports surface, and the performance surface is a support surface for supporting an artificial turf layer.

In an embodiment the step of providing a plurality of polymer fibres in a layer comprises use of a web producing process to provide a layer of entangled polymer fibres.

In an embodiment the step of providing a plurality of polymer fibres in a layer comprises use of a carding or air laid process to provide a layer of entangled polymer fibres.

In an embodiment the step of treating the polymer fibres comprises entangling the polymer fibres such that some or all of the polymer fibres are configured to project outwardly of the sheet.

In an embodiment the polymer fibres are entangled such that some or all of the polymer fibres which project outwardly of the sheet are arranged so that each provides at least one free end which projects outwardly of the sheet.

In an embodiment the polymer fibres are entangled such that some or all of the polymer fibres which project outwardly of the sheet are arranged so that each provides a loop portion which projects outwardly of the sheet. Each of the polymer fibres which provide a loop portion which projects outwardly of the sheet may have both ends thereof entangled with other polymer fibres in the sheet.

In an embodiment the step of treating the polymer fibres comprises needle punching.

In an embodiment the fibre entangling process comprises needle punching.

In an embodiment the step of treating the polymer fibres comprises hydro-entangling.

In an embodiment the fibre entangling process comprises hydro-entangling.

The method may comprise enhancing the degree to which polymer fibres of the performance surface layer are locked in position by a process in addition to the fibre entangling process, which enhances the degree to which polymer fibres of the performance surface layer are locked in position by the arrangement of fibres and contact between fibres in the mat.

The method may comprise enhancing the degree to which polymer fibres of the performance surface layer are locked in position by heat treatment.

The heat treatment may comprise applying heat by convection.

The heat treatment may comprise applying heat by radiation.

The heat treatment may comprise applying heat by conduction of heat from a treatment element.

The method may comprise enhancing the degree to which polymer fibres of the performance surface layer are locked in position by application of pressure.

Pressure may be applied by one or more rollers.

The method may comprise enhancing the degree to which polymer fibres of the performance surface layer are locked in position by calendaring.

In an embodiment the step of treating the polymer fibres comprises entangling the polymer fibres with at least one layer of scrim.

In an embodiment the step of treating the polymer fibres to form a sheet is performed in the absence of a scrim.

The method may comprise forming the sheet of entangled polymer fibres in the absence of a scrim and subsequently attaching the sheet to at least one layer of scrim.

The method may comprise manufacture of a mat for synthetic turf sports flooring comprising a performance surface on one side or both sides of the synthetic turf sports flooring.

The attachment of the sheet of entangled polymer fibres to the scrim may comprise forcing at least some of the polymer fibres through at least one layer of scrim.

The method may comprise manufacture of a mat for synthetic turf sports flooring comprising a performance surface layer on each side of the synthetic turf sports flooring. Such a mat for synthetic turf sports flooring could, if desired, be reversed when the performance surface layer on a first side becomes worn, damaged or degraded.

The method may comprise manufacture of a mat for synthetic turf sports flooring comprising at least one supporting layer of polymer fibre sheet, in addition to the performance surface layer.

The method may comprise manufacture of a mat for synthetic turf sports flooring comprising between one and ten layers of polymer fibre sheet, in addition to the sports surface layer. More than ten layers, in addition to the sports surface layer, may be used if desired.

At least one supporting layer of polymer fibre sheet may comprise a layer of non-woven polymer fibre sheet.

The method may comprise attachment of the performance surface layer to at least one supporting layer.

The method may comprise attachment of at least one supporting layer to at least one layer of scrim.

At least one supporting layer of polymer fibre sheet may be formed by a method comprising: providing a plurality of polymer fibres in a layer; and treating the layer of polymer fibres using a fibre entangling process to provide a sheet of entangled polymer fibres wherein substantially all of the polymer fibres of the sheet are locked in position by the arrangement of fibres and contact between fibres in the mat.

At least one supporting layer of polymer fibre sheet may be substantially identical to the performance surface layer.

At least one supporting layer of polymer fibre sheet may be different from the performance surface layer. For example, at least one supporting layer of polymer fibre sheet may differ from the performance surface layer in at least one of: mass per unit area; composition of polymer used to form the fibres; colour; surface characteristics; thickness; or other properties.

Attaching the layers forming the mat for synthetic turf sports flooring to each other may comprise needle punching.

Attaching the layers forming the mat for synthetic turf sports flooring to each other may comprise hydro-entangling.

Attaching the layers forming the mat for synthetic turf sports flooring to each other may comprise both needle punching and hydro-entangling.

The step of attaching the layers forming the mat for synthetic turf sports flooring to each other may comprise the step of treating the polymer fibres using a fibre entangling process to provide a sheet of entangled polymer fibres wherein substantially all of the polymer fibres of the performance surface layer are locked in position relative to the mat as a whole by the arrangement of fibres and contact between fibres in the mat. Thus the step of using a fibre entangling process to provide a sheet of entangled polymer fibres wherein substantially all of the polymer fibres of the performance surface layer are locked in position relative to the mat as a whole by the arrangement of fibres and contact between fibres in the mat, may be performed when two or more layers are in proximity and may also serve to attach two or more layers forming the mat to each other.

Attaching the layers forming the mat for synthetic turf sports flooring to each other may comprise attachment in the absence of adhesive or bonding substances other than those inherent in the polymer or polymers, or polymer fibres, used to form the layers.

The method may comprise attaching, or enhancing the attachment of, the layers forming the mat for synthetic turf sports flooring to each other by heat treatment.

The heat treatment may comprise applying heat by convection.

The heat treatment may comprise applying heat by radiation.

The heat treatment may comprise applying heat by conduction of heat from a treatment element.

The method may comprise enhancing the attachment of the layers forming the mat for synthetic turf sports flooring to each other by application of pressure.

Pressure may be applied by one or more rollers.

The mat may be manufactured in pieces approximately 4 meters to 8 meters wide and approximately 80 meters to 160 meters long. Of course, wider or narrower, longer or shorter pieces may also be produced if desired, depending upon the end use requirements.

In an embodiment the method comprises determining performance surface characteristics suitable for play of a particular sport, and selecting parameters used in manufacturing the mat to provide the desired performance surface characteristics and manufacturing the mat using the selected parameters.

Selecting parameters used in manufacturing the mat to provide the desired performance surface characteristics may comprise one or more of: selecting the polymer fibre composition or compositions (including but not limited to the polymer used and/or types and amounts of additives to provide desirable characteristics); selecting the length or lengths of the polymer fibres; selecting the gauge or gauges of the polymer fibres; selecting the cross sectional shape or shapes of the polymer fibres; selecting the fibre tenacity; selecting the fibre crimp; selecting the proportions of different types of polymer fibres; selecting the treatment to be used for entangling the polymer fibres; selecting the thickness of the mat; selecting mass per unit area of the mat, or any one or more of the layers which form the mat; selecting the resilience of the mat, or any one or more of the layers which form the mat; selecting the orientation of one or more layers (e.g. top up or bottom up, where top and bottom refer to the sides of the layers when manufactured in a substantially horizontal configuration); selecting the number of scrims to be used (including whether any scrim is to be used); selecting the type of scrim.

Determining performance surface characteristics suitable for play of a particular sport may comprise determining surface characteristics which correspond to those of conventional bowls playing surfaces.

Determining performance surface characteristics suitable for play of a particular sport may comprise determining surface characteristics which correspond to those of conventional golf greens, golf tees, or other golf playing surfaces.

Determining performance surface characteristics suitable for play of a particular sport may comprise determining surface characteristics which correspond to those of: conventional croquet playing surfaces; conventional hockey playing surfaces; conventional hoop-ball playing surfaces; conventional football playing surfaces; or conventional tennis playing surfaces.

Determining performance surface characteristics suitable for play of a particular sport may comprise determining surface characteristics which correspond to playing surface characteristics of other types of playing surface.

Selecting the treatment to be used for entangling the polymer fibres may comprise selecting the method of entangling the fibres.

Selecting the method of entangling the fibres may comprise selecting a needle punching process and parameters of the needle punching process.

Selecting parameters of the needle punching process may comprise one or more of: selecting needle design; selecting needle gauge; selecting needling density; selecting needling speed; selecting needling rate; selecting needling penetration.

Selecting parameters used in manufacturing the mat may comprise selecting a process, in addition to the entangling process, for enhancing the degree to which polymer fibres of the performance surface layer are locked in position and the parameters of the additional process.

Selecting the parameters of the additional process may comprise selecting one or more of: the temperature or temperatures applied; the pressure or pressures applied; the duration of application of pressure or temperature and variations of pressure or temperature over time; the contraction of polymer fibres and/or of part or all of a layer.

The method may comprise manufacturing a synthetic turf sports flooring in accordance with the first aspect.

The method may comprise manufacturing an underlay, for supporting a synthetic turf sports flooring, in accordance with the second aspect.

The mat for synthetic turf sports flooring may include any one or more of the features or characteristics set out in relation to the first and/or second aspects, and the disclosure herein should therefore be considered as including methods of manufacturing all such variations and alternatives.

According to a fourth aspect of the present disclosure there is provided a sports field comprising a compacted stone or road base foundation with drainage channels therein, and a synthetic turf sports flooring in accordance with the first aspect overlaid on top of the foundation.

In an embodiment an underlay in accordance with the second aspect underlies the synthetic turf sports flooring.

In an embodiment a geotextile material underlies the foundation.

In an embodiment the foundation comprises a base layer of relatively coarse compacted stone or road base and an upper layer of relatively fine compacted stone.

In an embodiment the drainage channels comprise lengths of pipe, each with one or more generally upwardly facing openings along its length to allow ingress of water.

In an embodiment the lengths of pipe are polymer pipe.

In an embodiment the lengths of pipe contain a filling material.

In an embodiment the sports field comprises multiple widths of synthetic turf sports flooring, joined to provide an effectively continuous playing surface. The widths of synthetic turf sports flooring may be joined by sewing or by use of a suitable adhesive.

The widths of synthetic turf sports flooring may be joined by adhesive tape.

The widths of synthetic turf sports flooring may be joined by sewing or thermo bonding.

Scrims are typically woven, but it should be appreciated that a layer functionally equivalent to a woven scrim could be made from a non-woven material. Accordingly, as used above and in the appended claims, the term 'scrim' is should be considered to include both a woven scrim and any layer functionally equivalent to a woven scrim, including a functionally equivalent non-woven layer.

BRIEF DESCRIPTION OF THE DRAWINGS

Embodiments will now be described, by way of example only, with reference to the accompanying drawings in which:

FIG. 7A is a cross-sectional and plan view of a first example of a scrim configuration which can be used in a sports surface layer, synthetic turf sports flooring and/or an underlay in accordance with the present disclosure;

FIG. 7B is a cross-sectional and plan view of a second example of a scrim configuration which can be used in a sports surface layer, synthetic turf sports flooring and/or an underlay in accordance with the present disclosure; and FIG. 8 is a cross-sectional view showing a synthetic turf sports flooring, underlay and an example of earthworks foundation construction, according to the present disclosure.

DESCRIPTION OF EMBODIMENTS

Figure 1A:
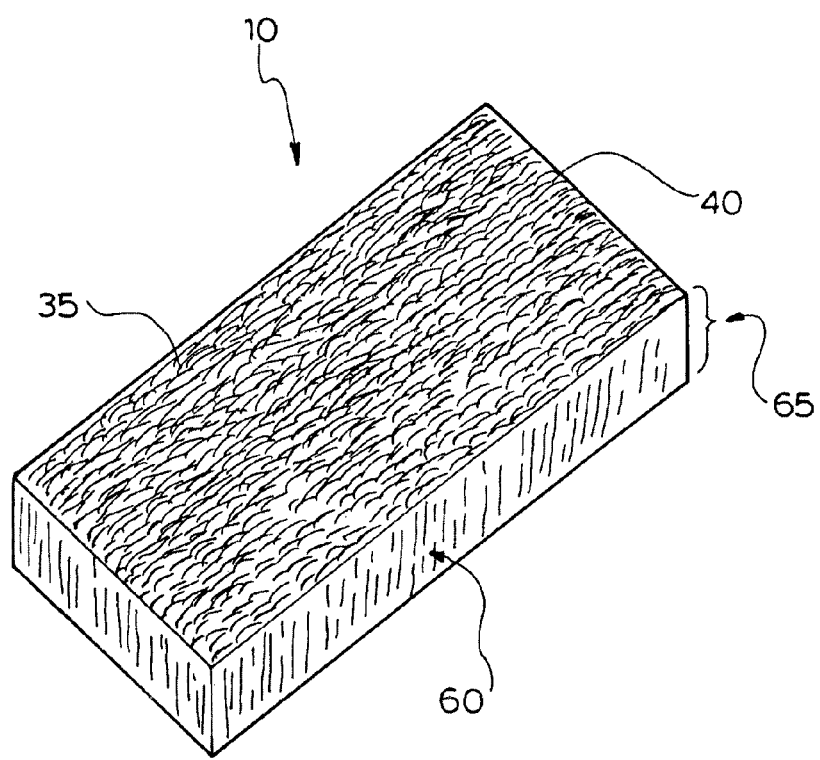
FIG. 1A is a schematic perspective view of a small area of an embodiment of a scrimless or self-supported sports surface layer of a synthetic turf sports flooring in accordance with the present disclosure, including schematic illustration of a cross section of the sports surface layer.
Figure 1B:
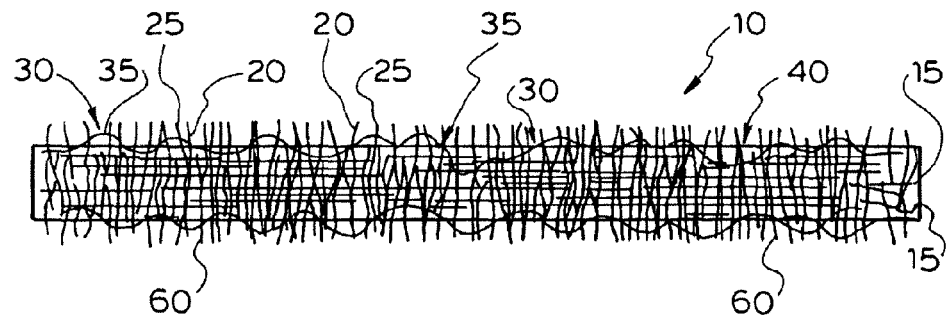
FIG. 1B is a schematic, solely cross sectional view of the embodiment of FIG. 1A, schematically illustrating in 35 more detail the arrangement of fibres projecting from the sports surface layer.

With reference to FIGS. 1A and 1B an embodiment of a sports surface layer of a synthetic turf sports flooring will now be described. In this embodiment the sports surface layer is in the form of a scrimless sports surface sheet, generally designated by the reference numeral 10.

As illustrated schematically in FIGS. 1A and 1B the scrimless sports surface sheet 10 comprises a plurality of polymer fibres, for example fibres 15 which are entangled to provide a non-woven sheet, scrimless sports surface sheet 10.

The purality of polymer fibres, preferably but not limited to polyester, used within the scrimless sports surface sheet 10 provides integrity to the structure by means of mechanical entanglement and/or fibre locking and surface friction between fibres enhanced during needle punching or other manufacturing processes.

For example, use of needle punching machines, such as Model No. NL9 or NL2000 commercially available from Autifa Solutions Germany GMBH can provide suitable needling density, penetration and mechanical fibre bonding to lock fibres in positions and provide integrity to the structure of a scrimless sports surface sheet, or to other embodiments described herein. The operating parameters of the needle punching process can be varied, as described elsewhere herein, to provide desired characteristics of the final product and its performance surface.

The scrimless sports surface sheet 10 may therefore be constructed without the use of chemical binders or bonding agents to achieve the required level of structural integrity. This can be advantageous because chemical binders or bonding agents may adversely affect the performance surface characteristics of an artificial sports surface.

In at least some embodiments, polymer fibres with different characteristics are blended prior to final entanglement of the polymer fibres. For example, providing and blending polymer fibres with different diameters has been found to provide desirable results. In one example, polyester fibres of approximately 10, 30 and 50 decitex are blended before final entanglement. This has been found to provide a sports surface sheet with good drainage and ball interaction characteristics. By way of a more general example, a blend of fibres may comprise two or more fibre types or sizes including a first plurality of fibres with a finer gauge (for example between 7 and 40 decitex), and second plurality of fibres with a coarser gauge (for example of between 20 and 70 decitex). In a further general example, a blend of fibres may comprise three or more fibre types or sizes including a first plurality of fibres with a finer gauge (for example between 7 and 30 decitex), a second plurality of fibres with a coarser gauge (for example of between 15 and 40 decitex) and a third plurality of fibres with a still coarser gauge (for example of between 20 and 70 decitex).

At least some of the polymer fibres are arranged to project out of the sheet: for example polymer fibres designated 20 provide free ends 25 which project out of the sheet, and polymer fibres designated 30 provide loop portions 35 which project out of the sheet. The scrimless sports surface sheet 10 provides a performance surface 40 suitable for playing a ball (or bowl) sports thereon. The performance surface characteristics may be selected by varying a number of parameters, as will be described in due course. A synthetic turf sports surface in accordance with the present disclosure may consist solely of a single scrimless sports surface sheet 10, for example when a small playing area is required and the underlying substrate is suitably smooth and cushioned, such as a smooth carpeted area. Alternatively, as will be described in due course, a synthetic turf sports flooring may comprise a number of layers, with or without one or more scrims, depending on the underlying substrate and desired playing surface characteristics.

It should be appreciated that, for clarity, FIGS. 1A and 1B are schematic representations which allow individual polymer fibres in the body of the sheet to be distinguished. Also for clarity the proportions of the fibres are not shown to scale: in a practicable embodiment the fibres would likely be much longer relative to their transverse or cross sectional size than shown in FIGS. 1A and 1B.

Further, in a practicable embodiment the polymer fibres would be much more convoluted in shape and entangled than is illustrated in FIGS. 1A and 1B.

The population densities, and the relative numbers, of fibres 20 which provide free ends 25, and fibres 30 which provide loop portions 35, are also shown by way of illustration only, and are not necessarily representative of a practicable embodiment. It will be observed that FIG. 1A illustrates primarily loop portions 35 extending from the scrimless sports surface sheet 10, whereas the view of FIG. 1B also illustrates a substantial number of free ends 25 which project out of the scrimless sports surface sheet 10.

For example, fibres used in a practicable embodiment may have a length between about 38 and 110 mm. Also by way of example, fibres used in a practicable embodiment may have a linear mass density of about 10 to 60 decitex (believed to correspond to a diameter, or average transverse size in the case of fibres with non-circular cross section, of about 0.03 to 0.08 mm, for polyester). Normally, polyester staple fibre is oval in cross section, although other cross sectional shapes may be used.

Of course, longer, shorter, coarser or finer fibres may be used. In some embodiments blends of fibres with differing lengths and diameters are used to provide the desired performance characteristics, which vary with the intended use of the product.

For example, relatively short fibres may be used for some applications. Using relatively short fibres (or using a fibre blend in which relatively short fibres predominate) will result in more fibre ends and fewer loops protruding from the surface of the sheet, which will provide different characteristics of a synthetic turf performance surface compared to a performance surface with more loops and fewer fibre ends protruding from the surface. Generally, a performance surface with more fibre ends and fewer loops protruding from the surface will provide greater resistance to the rolling of a bowl or ball than a performance surface with more loops and fewer fibre ends protruding from the surface, providing a 'slower' surface.

Similarly, using relatively small diameter fibres (or using a fibre blend in which relatively small diameter fibres predominate) allows the density for a given product to be increased, as the smaller fibres are generally more malleable and more receptive to compaction and entanglement due to needle punching and thermal distortion if heat is applied (for example, to effect compaction under heatsetting or similar conditions). Thus using small diameter fibres can result in greater interaction of the fibres with a bowl or ball and provide a 'slower' surface. Smaller fibres generally have greater flexibility so that the ball or bowl can more easily compress into the product surface, allowing the surface to have a greater influence and control of the ball or bowl. Conversely, thicker fibres tend to be stiffer or more inflexible, thereby keeping the ball on the top of the fibre surface matrix. Therefore, a performance surface in which thicker fibres are used will provide a synthetic surface which has a lower level of influence over the bowl or the ball, creating less drag and providing a faster surface. Providing surface characteristics which are suitable for the sport to be played (e.g., neither to fast nor too slow, and preferably corresponding to a conventional and/or natural grass surface typically used for the specific sport is generally desirable and may be regarded as giving the player a higher degree of actual ball or bowl control.

The scrimless sports surface sheet 10 may be manufactured by forming a plurality of synthetic fibres, which may comprise a blend of polymer fibres each component of the blend having different length, composition and/or cross sectional (e.g. diametric) size, into a mat or web, normally using a carding machine or a randomised carding machine, so that the staple fibres are in a somewhat random lateral direction but generally laying in a somewhat horizontal plane. The randomness of the orientation of the purality of fibres is increased during subsequent textile processing such as needle punching or hydro-entangling, whereby the fibres are also deformed so that at least parts of at least some of the fibres are oriented in a semi-vertical or vertical direction, see, e.g. fibres 25 in FIG. 1B and illustrative fibres 60 in FIG. 1A which are illustrated, schematically, as being within the thickness 65, rather than projecting from the surface of the scrimless sports surface sheet 10. However, it will be appreciated that free ends of at least some of the fibres 60 may project from the surface of the scrimless sports surface sheet 10.

The characteristics of the performance surface 40 are of particular importance as they greatly influence the behaviour of a ball or bowl which interacts with the synthetic turf sports flooring during play. When needle punching is employed to construct the scrimless sports surface sheet 10, needle size, needle design, needling density, needle punch rate and needle penetration can all be controlled to achieve the desired surface properties.

Further, if desired to enhance product integrity or to impart other desirable properties to the scrimless sports surface sheet 10, heat maybe applied during the manufacturing processes to "set" the product improve the bond between fibres. The heatset process causes various levels of fibre shrinkage within the synthetic sports surface and increases product density levels, which imparts greater surface friction between adjoining fibres, and provides increased tension and stress levels on the fibres of the scrimless sports surface sheet 10 to improve the locking of the polymer fibres in the scrimless sports surface sheet 10 and to improve overall integrity and dimensional stability of the product. Additionally, polyester bi-component, polyester high shrinkage or polyester low melt point fibres may be added to the polymer fibre blend to enhance bonding of the polymer fibres or increase the density of the scrimless sports surface sheet 10 as required for the specific end use of the product.

Techniques used in conjunction with the fibre bonding or binding process may include heat processing such as dry convection or radiation heat. Also heat setting can be achieved through wet processes including but not limited to use of steam or heated water. Similar results can be achieved by calendaring or pressing the product, either in a hot or cold state.

One to ten or more layers or sheets of non-woven polymer fibres may be overlayed and processed so as to build the thickness and density desired of the synthetic turf sports flooring, depending on the substrate conditions, particular sport and intended end use. In such embodiments the layers which underlie and support the sports surface sheet 10 may be regarded as support layers and may have surface (and/or other) characteristics different from those of the sports surface sheet 10 (although in some circumstances the or each support layer may be substantially identical to the sports surface sheet 10). The weight and make-up of each layer can be precisely controlled during manufacture, and may vary from layer to layer and product to product so as to achieve the desired specifications and characteristics for the synthetic turf sports flooring.

Figure 5:
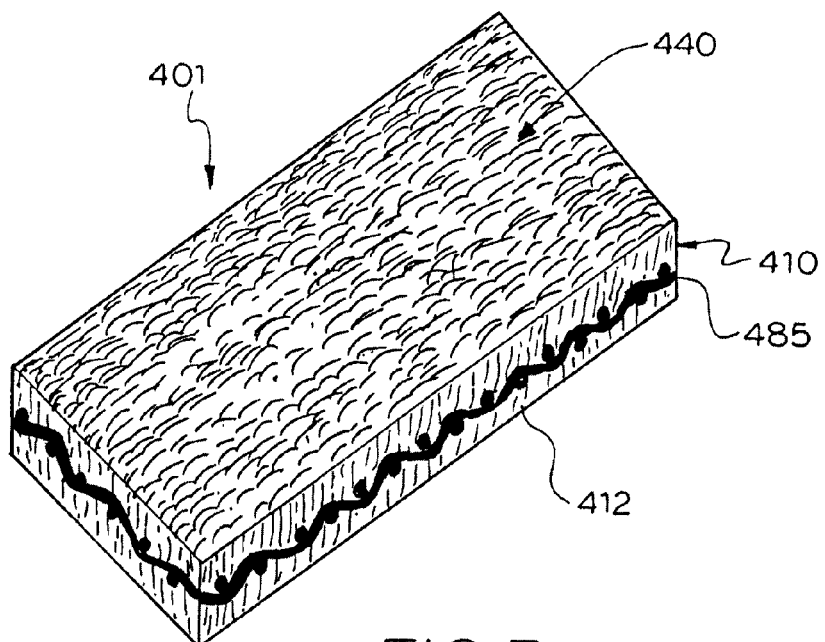
FIG. 5 is a schematic perspective view of a small area of an embodiment of a scrim-supported underlay in accordance with the present disclosure, including illustration of a cross section in which the scrim is shown.

Different diameter fibres can be used within each layer so that the support layers (for example, as illustrated in FIG. 5) can be different to the sports surface sheet 10, and to each other.

Sport surface performance may be enhanced by using fibres of different diameters within different layers to create a stratified effect within the layer construction of the product. Within the stratified structure the ratio of course to fine fibres with each web layer may be varied so the physical properties of each web layer are individually controlled. This allows the properties of synthetic sports flooring and/or underlay to be customised for specific sporting activities. By way of example, one or more of the inner web layers may use a higher percentage of course fibres in its web blend. The course fibres tend to form a more permeabile and more resilient web, even after needle punching. This may be desirable for player comfort in games such as croquet or for impact absorbsion for the ball in games such as golf. By controlling the fibre makeup in each layer, the properties of the overall product can also be controlled or modified to suit the intended use of the surface product or underlay as required.

This may be desired to enhance the design characteristics desired for a specific end use. By using a predominance of coarse or large cross sectional area fibres within a polymer fibre layer, the layer, and (if all other factors are equal) the performance surface of the end product will generally become more firm so that the ball or bowl speed will be increased. Additionally, larger diameter fibres will create a greater void area within the structure allowing the product to evacuate water more rapidly. Such an increased drainage rate may be desirable in regions of high rainfall and/or tropical regions where sudden downpours occur. High gravitational drainage rate is a desirable feature which can assist in allowing rapid resumption of play that is interrupted by rain and/or mitigating the effect of rain during play.

Layers with different characteristics may be provided symmetrically about the centremost layer, or may be provided non-symmetrically (for example with characteristics varying progressively through the thickness of the synthetic turf sports flooring). Thus the synthetic turf sports flooring may have symmetrical or asymmetrical properties through its thickness. It may be desirable, especially in precision ball game applications such as golf putting greens, hoop ball and bowling greens, to provide a synthetic turf sports flooring which can be turned over (for example after a number of years of use) so that the unworn underside can be used as a performance surface, thus providing additional service life. The performance surface properties in such embodiments may be required to be equal on each side to enable the synthetic surface to be reversible. Thus such an embodiment would provide a sports surface sheet 10 on each side of the synthetic turf sports flooring.

The currently preferred polymer for the polymer fibres is polyester or alloys of polyester. Polyester is versatile and has generally desirable characteristics such as resilience, good workability as a textile fibre, minimal moisture absorbance, thermal stability and relatively good resistance to UV degradation. However, other polymers may be used. These include but are not limited to acrylics, polypropylene, polyethylene, polyamide and combinations or blends or alloys of these and/or other fibres. The fibre of choice may be dependent upon the targeted sport or desired use of the sports area provided by the synthetic turf sports flooring and the conditions under which it is to perform, such as climatic conditions and whether it is located indoors or outdoors.

The performance surfaces of commercially available synthetic sports turf are believed to be exclusively, or almost exclusively, produced using polyolefin fibres such as polypropylene or polyethylene as these are relatively low cost and readily available in flat ribbon filaments and in various sizes varying diameter round or oval shaped or irregular shaped fibres.

Polyolefins have poor resistance to ultra violet degradation. When used for outdoor applications, stabilisers are normally added to the polymer to enhance resistance to ultra violet radiation and oxidation, so that the degradation rate of the fibres is reduced and acceptable service life may be achieved. In geographic regions with high ultra violet radiation levels, such as Southern Europe, Australia and the USA, even when stabilisers are added to the fibre, fibre degradation occurs undesirably quickly and service life is undesirably short, making replacement of the sports surface necessary at high cost and inconvenience to the end user.

Synthetic turf sports flooring in accordance with the present disclosure may utilise olefin based fibres for selected applications. However, polymers such as polyester and acrylics possess higher levels of inherent UV resistance, as well as other desirable properties. The UV resistance of these polymers may be further improved by introducing additives to the polymer during the manufacturing process to prolong the service life, with the possibility of service life of 10 years or more being possible in many outdoor environments. Such a service life, when using polyester fibres or modified polyester fibres, is well beyond the typical service life achieved when using polypropylene pr polyethylene fibres in high UV regions.

Games such as bowls, croquet, golf, tennis, hoop ball etc. rely upon the frictional, surface texture properties, density etc. of the playing surface to provide accurate and predictable bounce, direction and speed of the ball or bowl when contacting the playing surface. Polymers such as polyolefins have a relatively low glass transition temperature; for example approximately 18 degrees Celsius for polypropylene. When the temperature is near or just below the glass transition temperature of the polymer which provides the playing surface, the playing surface maintains its desired (designed) hardness and flexibility properties so that the surface retains its desired playing characteristics and properties. However, when the playing surface is exposed to temperatures above the glass transition temperature, the fibres or filaments begin to soften and become more flexible or pliable. This changes the hardness of the fibres and, consequently, the playing characteristics, including the frictional properties between the polymer playing surface and the ball or bowl. The higher the temperature, the softer the polypropylene fibres and sports surface becomes. This results in higher friction between the ball or bowl and the fibres or playing surface, making the ball or bowl speed slower and more reactive to the playing surface. Conversely, when the fibres are exposed to cold temperatures, olefin polymers become harder and stiffer, reducing friction with the ball or bowl, making the ball or bowl speed higher and the ball or bowl less reactive to the sports playing surface. As temperature in a sports area may vary rapidly with time and may vary considerably between different regions of the sports playing area, this highly temperature-dependent characteristic of olefin sports surfaces can lead to unpredictable and undesirable variation in the way the ball or bowl interacts with an olefin sports surface. Even the temporary shading of areas of a playing surface caused by passing cloud cover can influence the playing characteristics of an olefin sports surface, making it difficult or impossible for players to predict or "read" the speed, direction or bounce of the ball or bowl. Such variation and unpredictability is an undesirable trait for a playing surface to possess.

Further variation and unpredictability may be introduced by the presence of moisture. Olefins and the polymer binders used in many known sports surfaces absorb and hold and release moisture to varying degrees. During or after rain, moisture wicks into the surface of the fibres and also into the chemical binders. This moisture accumulation takes time to be reversed, leading to a delay before the playing surface can regain its desired (low moisture) characteristics. The retained moisture affects the frictional properties between the fibres and the ball or bowl, again making interactions of the ball or bowl with the playing surface unpredictable.

Embodiments in accordance with the present disclosure may utilise polymers with high glass transition temperatures and low moisture regain: for example polyester. Polyester has a high glass transition temperature of approximately 68 degrees Celsius so that ambient temperatures rarely if ever reach the glass transition temperature. Therefore use of polyester, or other polymers with at least similarly high glass transition temperatures, can assist in providing a predictable sports playing surface which is substantially uniform over the playing area, which does not vary rapidly, and which is readable by players. This allows the player's skill or abilities to become a significant factor in the outcome of competitive and skill based games such as bowls and golf. Additionally, polyester has a low moisture absorbency rate or regain compared to at least some polymers used for previously known artificial turf, and therefore has minimal absorption or moisture retention within the fibre compared to some other fibres previously used for synthetic turf.

Polyester is hydrophobic so compared to fibres of less hydrophobic polymers, polyester fibres repel water effectively and remain relatively dry to the touch in the presence of moisture. Combined with configuring embodiments so that they drain effectively, this allows use of polyester based embodiments to be used almost immediately after rain ceases, enabling players to complete rain interrupted games without major adjustment to their playing techniques or mind-set. Effective and rapid moisture evacuation, including liquid drainage properties, of a playing surface is important to the efficient and continuous use of the playing surface.

Embodiments in accordance with the present disclosure may avoid the use of bonding or binder materials, relying instead on the configuration, properties and treatment of the polymer fibres to lock the fibres in position and provide integrity of the synthetic turf sports flooring. Having the fibres which form the surface layer adequately locked in position, so that they do not fall out of the flooring or "shed", and the overall structural integrity of the synthetic turf sports flooring, are important to achieve and maintain satisfactory service life, product performance, aesthetic appeal and player satisfaction. Synthetic turf sports flooring in accordance with the present disclosure can be constructed using the polymer properties and described textile engineering principles and methods to maintain product stability and integrity. Thus substantially all of the polymer fibres of the sports surface layer are locked in position relative to the synthetic turf sports flooring product as a whole entirely (or substantially entirely) by the arrangement of fibres, surface friction between fibres and/or inherent bonding of fibres in the synthetic turf sports flooring product.

In contrast, most or all previously known synthetic turf sports surfaces rely upon binder or bonding resins or like materials to hold the fibres in place and to minimise fibre shedding or breakage. The binder or bonding materials in such known synthetic turf sports surfaces act as an adhesive or glue to lock and hold the fibres together and in place. In such known synthetic turf structures of the tufted type, the ribbons, filaments or yarns are inserted into the scrim or base and then held in place by adhesives. Such known synthetic turfs of non-tufted type use coating, immersion, semi-immersion or spray application techniques, or combinations of these, to bond or hold the fibres together and in place through chemical reaction bonding technology. The binder or bonding materials are typically different in chemical composition compared to the polymer fibres and therefore can react differently to the polymer fibres when exposed to temperature changes or moisture. Thus the use of binder or bonding materials may contribute to the variation and unpredictability of a ball's speed and behaviour when the sports surface is exposed to temperature variation and/or moisture, for example when there is high atmospheric humidity in the presence of rain, dew etc. Avoiding use of use of binder or bonding materials can avoid this undesirable contribution to the variation and unpredictability of a ball's speed and behaviour.

Embodiments of synthetic turf sports flooring in accordance with the present disclosure provide a performance surface 40 the characteristics of which can be determined at the manufacturing stage by adjustment of a number of variables, as set out elsewhere herein, according to the intended end use. In embodiments described herein, the performance surface 40 does not require sand or other infill materials to be used. This contributes to low maintenance requirements compared to at least some previously known synthetic turf for use in sports, which requires infill. Infill materials, such as sand, diatomaceous earth, granular rubber, granular plastics and the like filler agents are often used in at least some previously known synthetic turf for use in sports. At least some previously known synthetic turfs for use in sports require infill materials to be evenly and uniformly spread and imbedded into tufted fibres or filaments over the entire playing surface to achieve an acceptable level of consistency within the playing area. Such infill technology requires a high level of maintenance during the full life of the sports playing area. Periodic agitation of the infill over the entire area of the playing area is also required to maintain the playing area at the desired infill consistency. Measuring and replenishing infill levels, levelling and compacting the infill and watering and compacting the infill is also necessary. This may require specialist knowledge, training, expensive sophisticated machinery and precious water resources and well as a considerable maintenance time. Additionally, in at least some previously known synthetic turfs for use in sports, heavy rain and water pooling or water run-off can cause the infill to be dislodged or compacted, requiring it to be re-distributed and, at times, replaced. Maintenance of at least some previously known synthetic turfs for use in sports also requires specialist trained maintenance personnel to ensure the product uniformity is retained, particularly for high competition level games. The physical playing properties of such infill synthetic sports surfaces also change significantly during and after rain as moisture levels fluctuate. This causes inconsistent and unpredictable bounce, speed or roll of the ball or bowl and also contributes to discomfort to the players. Embodiments of synthetic turf sports flooring in accordance with the present disclosure are almost maintenance free, requiring only a periodic vacuum cleaning with a commercial type vacuum cleaner, appropriately designed for the size and layout of the sports playing field in question.

Appropriate embodiments of synthetic turf sports flooring in accordance with the present disclosure can be used in many types of end use applications as a sports playing surface for both indoor and outdoor use. For indoor use, the synthetic turf sports flooring may be laid or placed directly onto a smooth and level surface such as a wooden or concrete floor or onto pre-existing commercial carpet or the like. A backing or underlay support surface of similar construction to the synthetic sports surface may be also used when desired or needed to suit specific performance requirements of the synthetic sports surface. The synthetic turf sports flooring may be permanently installed or rolled up, removed and stored as desired.

Figure 2:
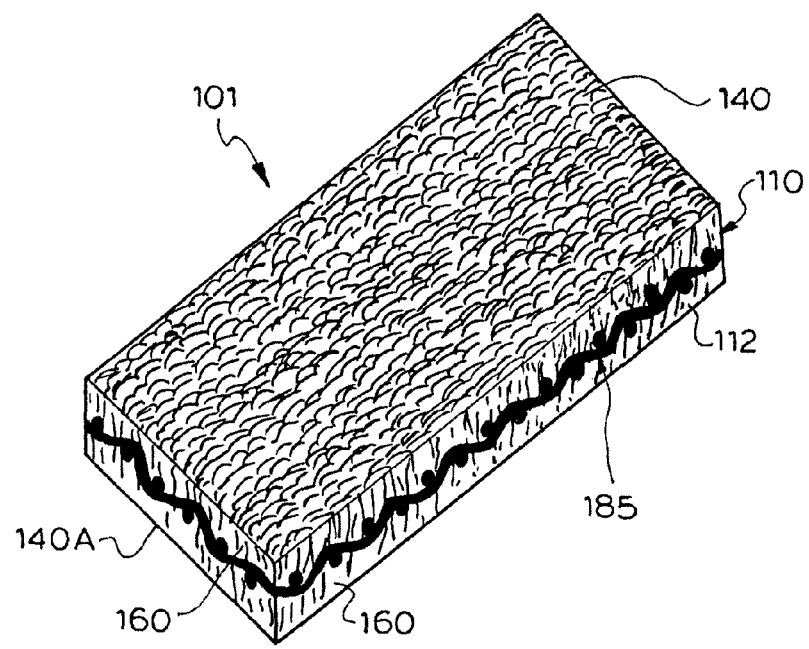
FIG. 2 is a schematic perspective view of a small area of an embodiment of a scrim-supported synthetic turf sports flooring in accordance with the present disclosure, including illustration of a cross section in which the scrim is shown.

FIG. 2 is a perspective view of an embodiment of a synthetic turf sports flooring comprising one or more layers of nonwoven polymer fibre sheet supported by a scrim to provide a scrim-supported synthetic sports flooring according to the present disclosure.

In this embodiment the synthetic turf sports flooring is in the form of a flexible synthetic turf 101, which may be provided, as a final product, in the form of a large sheet, for example approximately 4 to 8 meters wide and approximately 80 to 160 meters long (although of course final products of different dimensions may be provided).

As illustrated, the flexible synthetic turf 101 comprises a scrim (or 'base') 185, which is attached to, and which supports, an upper layer of polymer fibre sheet 110 and a lower layer of polymer fibre sheet 112. The upper layer of polymer fibre sheet 110 may be regarded as an example of a sports surface layer and has a performance surface 140, distal from the scrim 185. The lower layer of polymer fibre sheet 112 may be a support layer, merely for supporting the scrim 185 or, if the flexible synthetic turf 101 is desired to be reversible, may be a sports surface layer and have a performance surface 140A, distal from the scrim 185.

It will be appreciated that in an alternative embodiment the scrim 185 may support only a single layer of polymer fibre sheet, in which case the single layer of polymer fibre sheet will be an example of a sports surface layer and will have a performance surface, distal from the scrim.

In an embodiment a single layer of polymer fibre sheet, entangled with a scrim may be regarded as a sports surface layer (irrespective of whether additional, support, layers are included).

In a further alternative embodiment, the scrim may support a plurality of layers of polymer fibre sheet comprising an outermost upper layer which constitutes a sports surface layer and has a performance surface, and one or more support layers provided between the scrim and the outermost upper layer.

In a further embodiment the scrim may support upper and lower sports surface layers, one or both of which may be spaced apart from the scrim by one or more support layers provided between the scrim and the applicable sports surface layer.

Returning now to the embodiment illustrated in FIG. 2, flexible synthetic turf 101, either of both of the layers of polymer fibre sheet 110, 112 may be formed or manufactured as described above in relation to manufacture of the scrimless sports surface sheet 10, and then attached to the scrim 185.

It is preferred that the attachment of the layers of polymer fibre sheet 110, 112 is performed without the use of adhesives, binders or bonding agents other than those inherent in the materials of the layers of polymer fibre sheet 110, 112 and the scrim. Thus the attachment is preferably performed by use of one or more of textile treatment processes such as needle punching, hydro jet entanglement, heating, pressure application, or the like, as mentioned above.

It should be appreciated that at least some of the manufacture of the layers of polymer fibre sheet 110, 112 may be performed in the presence of the scrim 185, so that at least some of the manufacturing process for at least one of the layers of polymer fibre sheet also constitutes the attachment at least some of the attachment process.

In the embodiment illustrated in FIG. 2, flexible synthetic turf 101, the scrim or base 185 is incorporated into the centre (mid-line) of the flexible synthetic turf 101. However, it should be appreciated that the position of the scrim may be varied depending upon the desired properties of the flexible synthetic turf as well as the end use application of the product. In certain circumstances, it may be a requirement for the scrim 185 to be positioned closer to the performance surface 140 or it may be desirable to have the scrim 185 positioned closer to the back surface.

As illustrated, flexible synthetic turf 101 is a needle-punched scrim-reinforced synthetic turf product. FIG. 2 illustrates schematically a generally vertical orientation of the polymer fibres 160 in the layers of polymer fibre sheet 110, 112 achieved by the needle punching process. However, this should be viewed bearing in mind FIG. 1B and the accompanying disclosure. The polymer fibres are tightly jammed together by the needling techniques employed in manufacture. The fibre length can range from 38 mm or less to 110 mm or longer. The preferred length range varies between 70 mm and 100 mm for needle punch technology. As a result of the needle punching process (or other attachment process such as hydro jet entangling) many fibres may run from the upper performance surface 140 of the upper layer of polymer fibre sheet 110 through the scrim 185 to the bottom surface of the flexible synthetic turf 101, which may be performance surface 140A of the lower layer of polymer fibre sheet 112.

The design and density of the scrim 185 aids to lock the fibres in place and is an aid to achieving product integrity.

At the performance surface 140 (or the performance surfaces 140, 140A, where the flexible synthetic turf 101 is reversible and has two performance surfaces) a semi random matrix of polymer fibres is formed. Some fibres are deformed into loops while others have ends protruding. The degree of smoothness of the surface is selected according to the end use of the product and its desired properties.

The properties of the performance surface 140 (and, if applicable, 140A) of the flexible synthetic turf 101 are extremely important. The performance surface 140 must be uniform in texture and possess the required properties for the particular game for its designated use. The games of bowls and golf, for example, require the performance surface to offer a certain resistance to the roll of the bowl or ball. Additionally, the bowl or ball is must interact with the performance surface in a manner that allows maintenance of the desired line of travel, whether in a straight line (for example in golf) or in a predictable curve (for example in bowls). The player must be able to predict the line the bowl or ball will travel and the speed at which the bowl or ball will continue to run. The texture of the performance surface 140 must be correctly designed to achieve this precision. This is achieved through correct selection of the polymer, fibre blend, media make-up weights and use of the appropriate manufacturing techniques.

By incorporating a reinforcement scrim or base 185 within the flexible synthetic turf 101 (or, more generally, within the synthetic turf sports flooring) the product strength, dimensional stability, integrity, resilience and durability is enhanced. These are desirable properties, the enhancement of which is particularly valuable when the product is permanently installed in an outdoor environment where the synthetic turf sports flooring is subjected to climatic elements and more rigorous use. Examples of scrims that may be used will be discussed in due course with reference to FIGS. 7A and 7B.

As mentioned above, various alternative polymer fibres, or a mix or blend of fibres, can be used to form the sports surface layer (and, indeed, other layers), provided they have the required properties to meet the needs of the application and end use. Suitable polymer fibres are typically round, oval or irregular in cross section depending upon the properties of the individual polymer and the fibre extrusion process or spinneret used to make the polymer fibres. Fibrillated fibres or texturised fibres may also be employed where end use dictates, especially for indoor sports activities. Fibrillated ribbon-like or blade-like fibres be considered to provide a more natural grass-like appearance and may be used if desired. Polymer fibres that have different fibre diameters (and/or shapes) may be blended together and intermingled before final entanglement. As mentioned above, using a blend of polymer fibres of different diameters has been found to provide desirable characteristics. In one embodiment using a blend of polyester fibres of approximately 10, 30 and 50 decitex has been found to provide a sports surface sheet with good drainage and ball interaction characteristics. Of course, other mixes of fibre sizes or characteristics may suit other intended end uses, so this particular blend is provided by way of example only.

The selection of polymer, fibre length and fibre diameters is dependent upon the required and desired properties and end use of the synthetic turf sports flooring. For example, when producing a performance sports surface for use as a golf putting green, it is desirable for the performance surface to allow the ball to run true to line, and provide controlled and predictable bounce of the ball and ball speed. The performance surface must also resist bruising caused by the ball. Such applications may require a blend of UV resistant polyester fibres, alloys of polyester or a polyester/nylon blend of fibres to be used in the performance surface. Further, finer (smaller diameter) fibres, for example using a predominance of fibres in the 8 to 30 decitex range, may be appropriate to provide the desired performance characteristics, although coarser and/or finer fibres may also be used. Similarly a stratified construction as described previously can be beneficially provided by one or more support layers to provide resilience and control ball bounce for high trajectory balls impacting the performance surface. The support layer or layers may consist of a predominance of 40 to 60 decitex fibres, although larger and small fibres may also be used within the structure.

Finer polymer fibres have greater surface area per unit mass compared to large diameter fibres of the same polymer make-up. High surface area is a desirable property to enhance mechanical bonding of fibres in manufacturing non-woven sheets. Generally speaking, higher surface contact results in greater mechanical binding of the fibres. This, combined with the entanglement of the fibres can enhance product strength, dimensional stability and product integrity.

Polymer blends and combinations of fibre diameters ranging up to 110 decitex (99 Denier) or larger can be successfully employed to enhance free moisture drainage, improve clean ability etc. and provide optimum playing characteristics or properties. A single layer of scrim, or multiple layers of scrim, may be employed depending upon the desired characteristics of the product and intended end use.

Figure 3:
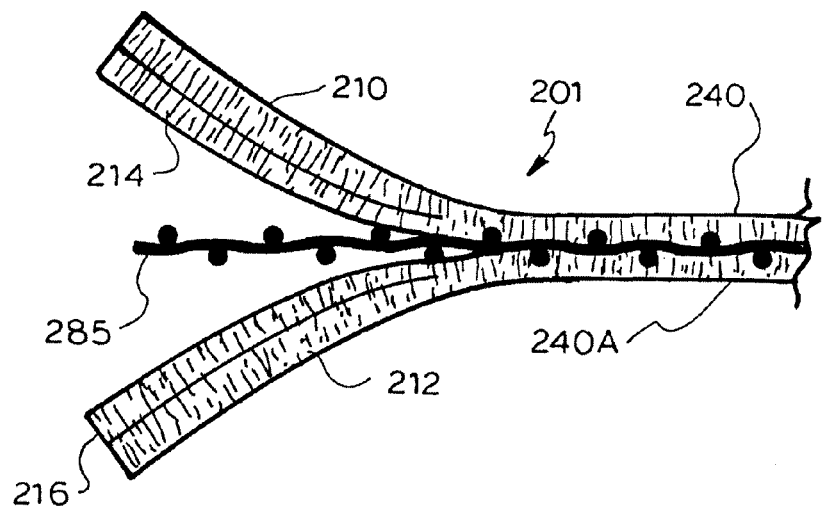
FIG. 3 is a schematic partially exploded cross sectional view of an embodiment of a scrim-supported synthetic turf sports flooring in accordance with the present disclosure showing a scrim and four polymer fibre layers being married to the scrim.

FIG. 3 is a partially exploded view of an embodiment of a synthetic turf sports flooring, in the form of a flexible synthetic turf 201, which may be provided, as a final product, in the form of a large sheet, for example approximately 4 to 8 meters wide and approximately 80 to 160 meters long (although of course final products of different dimensions may be provided) comprising a scrim 285 and one or more support layers 214, 216 of nonwoven polymer fibre sheet between the scrim 285 and each of upper and lower layers of polymer fibre sports surface sheet 210, 212 respectively. As illustrated in FIG. 3, only a single support layer 214 of nonwoven polymer fibre sheet is illustrated between the scrim 285 and the upper and layer of polymer fibre sports surface sheet 210, and only a single layer 216 of nonwoven polymer fibre sheet is illustrated between the scrim 285 and the lower layer of polymer fibre sports surface sheet 212, but it will be appreciated that more or fewer layers could be used on either side of the scrim 285, if desired, taking into account the desired characteristics and end use properties of the product.

The layers of polymer fibre sports surface sheet 210, 212 and the support layers 214, 216 of nonwoven polymer fibre sheet are mechanically attached to the scrim 285 by a needle punching process or other suitable means. The mass per unit area of each support layer 214, 216 and each sports surface sheet 210, 212 can be selected at manufacture to achieve the targeted outcome of the end product, but typically are between 50 gm/m2 and 400 gm/m2, although it may be desirable to use lighter or heavier layers depending upon the technology employed to manufacture the structure. One to ten or more layers may be overlayed and processed so as to build the thickness and density desired for the particular sport and intended end use. Drainage is controlled by scrim selection, fibre selection and manufactured density.

It will be appreciated that the flexible synthetic turf 201 may be similar in many respects to the flexible synthetic turf 101, and that FIG. 3 and the corresponding description should be viewed in the light of the description of preceding Figures, above.

The polymer type used in each layer may be selected as desired. By way of example, the polymer fibre sports surface sheet 210, 212 may be manufactured using polyester fibres, while the support layers 214, 216 may be made using a different polymer. Different polymers may also be blended together within the same layer to achieve desired performance requirements. Layers may also be applied to the scrim material from only one side or opposing directions to give the product symmetrical or asymmetrical properties. As described above, a performance surface 240, 240A may be provided on each side of the flexible synthetic turf 201, to enable the flexible synthetic turf 201 to be reversible. This would generally require the performance surface properties (and underlying construction and composition) to be equal on each side to provide identical or similar playing characteristics. However a reversible but asymmetrically constructed embodiment in which the playing characteristics on opposed sides are different, to enable a first side of the flexible synthetic turf 201 to be exposed for play of a first sport (e.g.

bowls) and a second side of the flexible synthetic turf 201 to be exposed for play of a second, different sport (e.g. hoop ball) is possible.

As set out above, embodiments in accordance with the present disclosure may rely upon fibre arrangement, entanglement and/or inherent bonding of fibres to lock the fibres in place and provide structural integrity of the product. The entanglement of fibres, for example by needle punching, plays an important role in providing the desired product characteristics. When needle punching is used, the important performance characteristics of non-fibre shedding, product strength and product performance are controlled by a number of factors including but not limited to fibre polymer selection, fibre tenacity, fibre length fibre diameter, fibre crimp, mass of the webs and number of webs, needle design, needle penetration, needling speed, controlled contraction rates and when required, scrim design, scrim weight, scrim weave, scrim density and product finishing techniques.

It will be appreciated that these and other factors will affect the interaction of the performance surface with a bowl or ball. Embodiments in accordance with the present disclosure may be manufactured by a process which involves determining performance surface characteristics suitable for play of a particular sport, selecting manufacturing parameters, relating to the various factors, to be used in manufacturing the product to provide the desired performance surface characteristics and manufacturing the product using the selected parameters. The effect on performance surface characteristics resulting from a change in any given factor or parameter may also depend on the other factors or parameters, so it is believed inappropriate to detail the effect of varying each factor herein, although indicative descriptions of varying some of the factors (such as fibre thickness) have been provided elsewhere in this disclosure. However, it will be appreciated that the effect of varying a single factor, with other factors kept constant, can be determined empirically, and that selection of the parameters used can be selected using such empirical determinations.

Adequate structural integrity of the product is also important, and this too can be achieved, without the use of additional binders or adhesives, by the entanglement of the fibres of the product and suitable choice of the other factors described herein. Typical values of product strength exceed 350N/5 cm although actual strength requirement many vary dependent upon end use. Strength values higher and lower than 350N/5 cm are normal. For example, scrimless synthetic sports flooring for indoor use may be adequately serviced by products with strength less than 250N/5 cm. Thus products with strength varying between 200N/5 cm (or even less) and 500N/5 cm (or even more) may be considered appropriate depending on the intended end use, and may be achieved by suitable selection of one or more scrims (or absence thereof), polymer fibre characteristics, entanglement process, additional strength enhancement (such as by application of heat or pressure) and other factors.

Figure 4:
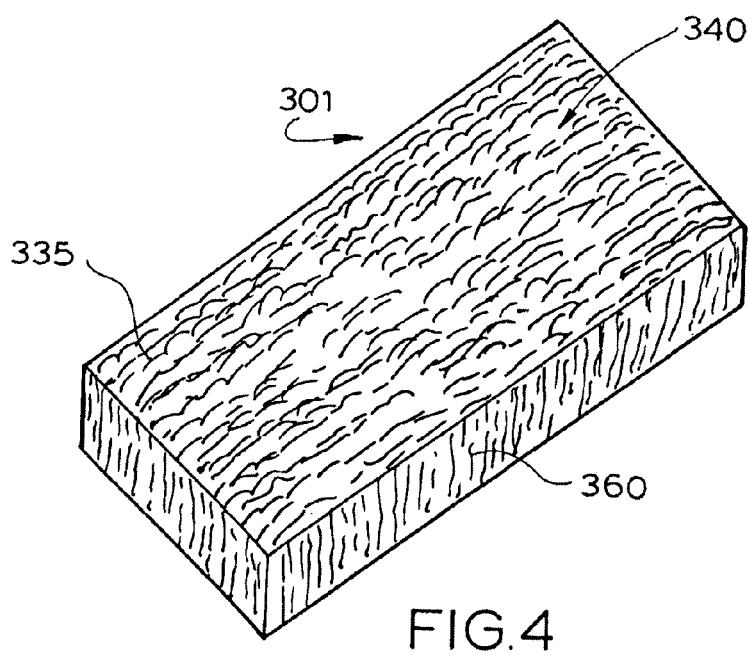
FIG. 4 is a schematic perspective view of a small area of an embodiment of a scrimless or self-supported underlay sheet in accordance with the present disclosure, including schematic illustration of a cross section of the underlay sheet.

FIG. 4 is a schematic perspective view of an embodiment of a polymer fibre sheet for an underlay in accordance with the present disclosure. As illustrated in FIG. 4, this embodiment comprises a scrimless or self supported synthetic sports underlay sheet, generally designated 301. The scrimless synthetic sports underlay sheet 301 may be used as a layer, for example a surface layer, of a sports underlay, or can, under some circumstances, be used on its own as an underlay. The scrimless synthetic sports underlay sheet 301 may be constructed similarly to the scrimless sports surface sheet 10 using similar manufacturing technology and techniques. Thus the scrimless synthetic sports underlay sheet 301 may comprise a sheet of polymer fibres 360, which are mechanically entangled and which have been mechanically treated so that at least some of the fibres 360 provide loops 335 or free ends extending from a performance surface 340.

Some embodiments of a scrimless synthetic sports underlay sheet 301, and variations thereof, may be regarded as substantially identical to embodiments of the scrimless sports surface sheet 10, and variations thereof, as described above. In practice, however, there are likely to be differences between the scrimless synthetic sports underlay sheet 301 and the scrimless sports surface sheet 10, as will be described in due course.

FIG. 5 is a perspective view of an embodiment of an underlay in the form of a scrim supported synthetic underlay sheet 401 in accordance with the present disclosure.

The scrim supported synthetic underlay sheet 401 is designed and manufactured in a similar manner to the scrim reinforced flexible synthetic turf 101. Thus the scrim supported synthetic underlay sheet 401 has a scrim 485 to which are attached an upper layer of polymer fibre sheet 410 having a performance surface 440 for supporting a synthetic turf sports flooring, and a lower layer of polymer fibre sheet 412.

The scrim supported synthetic underlay sheet 401 may play an important role in providing the required density, thickness, cushioning effect, resilience and water drainage to adequately support a synthetic turf sports flooring, such as flexible synthetic turf 101 or 201. These properties of the underlay may directly influence the performance of the sports area provided. Of lesser importance is the performance surface 440 of the scrim supported synthetic underlay sheet 401 as the bowl or ball does not make contact with the actual fibrous performance surface 440. More important features are the uniformity of density, mass and resilience properties of the scrim supported synthetic underlay sheet 401.

Some embodiments of a scrim supported synthetic underlay sheet 401, and variations thereof, may be regarded as substantially identical to embodiments of the flexible synthetic turf 101, and variations thereof, as described above. In practice, however, there are likely to be differences between the scrim supported synthetic underlay sheet 401 and the flexible synthetic turf 101, as will be described in due course.

Figure 6:
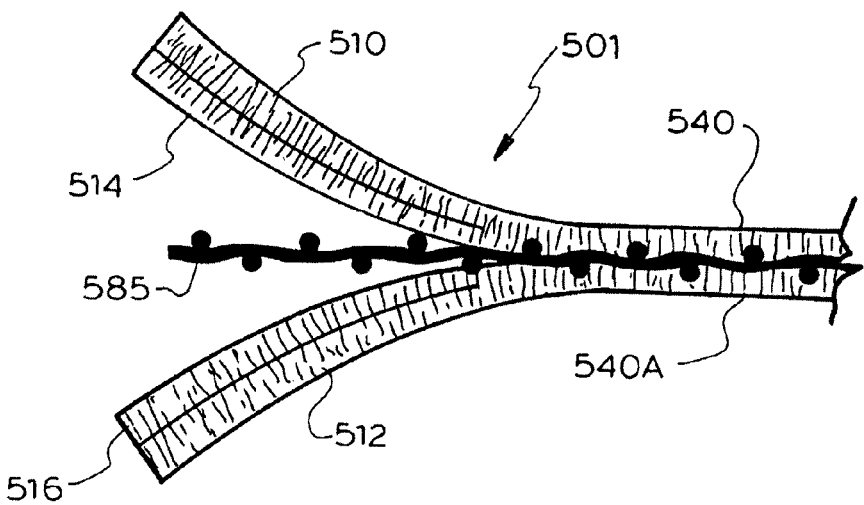
FIG. 6 is a schematic partially exploded cross sectional view of an embodiment of a scrim-supported underlay in accordance with the present disclosure showing a scrim and four polymer fibre layers being married to the scrim.

FIG. 6 is an exploded view of an embodiment of an underlay in the form of a scrim supported synthetic underlay sheet 501 in accordance with the present disclosure.

The scrim supported synthetic underlay sheet 501 is designed and manufactured in a similar manner to the scrim reinforced flexible synthetic turf 201. Thus the scrim supported synthetic underlay sheet 501 has a scrim 585 to which are attached an upper layer of polymer fibre sheet 510 having a performance surface 540 for supporting a synthetic turf sports flooring, and a lower layer of polymer fibre sheet 512. One or more support layers 514, 516 of nonwoven polymer fibre sheet are provided between the scrim 585 and each of upper and lower layers of polymer fibre sheet 510, 512 respectively. As illustrated in FIG. 6, only a single support layer 514 of nonwoven polymer fibre sheet is illustrated between the scrim 585 and the upper layer of polymer fibre sheet 510, and only a single layer 516 of nonwoven polymer fibre sheet is illustrated between the scrim 585 and the lower layer of polymer fibre sheet 512, but it will be appreciated that more or fewer layers could be used on either side of the scrim 585, if desired.

Drainage is controlled by scrim selection, fibre selection and manufactured density.

The characteristics of the underlay sheet 301 and underlays 401, 501 may be selected by suitable selection of materials and manufacturing variables, according to the required enduse characteristics of the underlay being manufactured. Thus there is no single feature or characteristic which definitively distinguishes all underlays in accordance with the present disclosure from all synthetic turf sports flooring in accordance with the present disclosure. Similarly no single feature or characteristic definitively distinguishes any given layer of an underlay in accordance with the present disclosure from a corresponding layer of a synthetic turf sports flooring in accordance with the present disclosure.

Of course, it is an important feature of the performance surface of the scrimless sports surface sheet 10 that it is suitable for interaction with a ball or bowl. A performance surface 340 of a synthetic sports underlay sheet 301 is not required to contact a ball or bowl, but merely to support a synthetic turf sports flooring, so its characteristics generally need not be so rigorously controlled. More important features are the uniformity of density, mass and resilience properties of the synthetic sports underlay sheet 301, 401, 501. However, it is possible to provide the synthetic sports underlay sheet 301 as an embodiment identical to the sports surface sheet, if desired.

Normally, however, layers of the underlay will be generally lighter in mass per unit area, compared to layers of the synthetic turf sports flooring.

Thus the scrimless synthetic sports underlay sheet 301 will be generally lighter in mass per unit area, compared to the scrimless sports surface sheet 10. Similarly underlays in accordance with the present disclosure may require fewer layers than synthetic turf sports flooring, or lighter weight per unit area layers.

Additionally, the synthetic underlay is not normally subjected to ultra violet radiation or abrasion during use and therefore may, if desired, be manufactured using lower cost fibres than those used in manufacture of the scrimless sports surface sheet 10 and/or synthetic turf sports flooring 101, 201. Similar web laying and needling technology is employed to that used in manufacture of the scrimless sports surface sheet 10 and/or synthetic turf sports flooring 101, 201, so that fibre orientation within the underlays 301, 401, 501 after needle punching is similar.

As with the synthetic turf sports flooring product, embodiments of underlay, or layers of an underlay, in accordance with the present disclosure may rely upon fibre arrangement, entanglement and/or inherent bonding of fibres to lock the fibres in place and provide structural integrity of the product, and may be free from additional bonding or adhesive agents. It will be appreciated that as the function of the underlay is different to the function of the synthetic turf sports flooring, required characteristics will be different, for example, the performance surface of the underlay is not required to have specific properties in relation to its contact with a ball or bowl, and the requirement that fibres do not shed is of less importance. The underlay can be manufactured accordingly, taking into account economic factors.

FIGS. 7A and 7B provide cross-sectional and plan views of typical scrim configurations that can be used for the synthetic turf sports flooring 101, 201, and underlays 401, 501, according to the present disclosure. FIG. 7A illustrates a plain weave configuration scrim 645 and FIG. 7B illustrates a 2×2 twill weave configuration scrim 650.

Scrim structures that can be used include monofilament, plied monofilament, multifilament, plied multifilament, staple spun yarn, needle punched, water jet entanglement, and melt blown, including combinations of these structures. Weave patterns of the scrim structure can be varied depending upon the technology employed to construct the synthetic sports surface and underlay products. Multiple scrims can also be employed as determined by the end use characteristics of the synthetic turf sports flooring and underlay.

As detailed above, the synthetic turf sports flooring and synthetic underlay can be manufactured with or without incorporating a scrim or base. The decision to use or not use a scrim or base is may be taken depending upon the desired properties of the final product. If a scrim is used single-layer or multiple-layer weave may be employed. Additionally single or multiple scrim layers may be used within the synthetic turf sports flooring or underlay to obtain desired product performance.

The plain weave configuration scrim 645 of FIG. 7A and the 2×2 twill weave configuration scrim 650 of FIG. 7B are illustrative of types of practicable weave patterns that may be employed, but the present disclosure should not be considered to be limited to any particular type or types of scrim. The selection of scrim weave, material and/or construction will depend upon end application requirements of the synthetic turf sports flooring (e.g 101, 201) or underlay (e.g. 401, 501) as well as manufacturing equipment limitations and costs of production. Normally, scrims or bases of a woven construction will result in faster water drainage or evacuation than scrims or bases of non-woven construction. A woven scrim or base constructed using monofilament yarn construction will generally drain more freely than the equivalent scrim or base constructed using staple spun yarns. Selection of the scrim taking into account these and other factors allow the synthetic turf sports flooring (e.g 101, 201) or underlay (e.g. 401, 501) to be custom designed for specific end use applications for drainage, resilience, ball control and player comfort etc. Ball trajectory games such as golf, require the playing surface to simulate a natural grass "green" or other playing surface and to control bounce, so construction which limits bounce must be employed.

FIG. 8 is a schematic cross-sectional view of an embodiment of a sports ground structure, generally designated 701, including a synthetic turf sports flooring, which may for example be flexible synthetic turf 101, and an underlay which may for example be scrim supported synthetic underlay sheet 401, overlaid on earthworks foundation construction, as will be described below.

The sports ground structure 701 comprises an appropriate grade geotextile blanket 700, above which a compacted road base or compacted sized stone 705 is provided (to engineers specification). The compacted road base or compacted sized stone 705 is permeable and free draining. The compacted road base or compacted sized stone 705 incorporates a series of drainage channels, for example drainage channel 710. The drainage channels 710 are lined with appropriate grade geotextile lining 715. A slotted or perforated drainage pipe 720, with appropriate fall levels, is incorporated into each of the drainage channels 710. The drainage pipes 720 may be PVC pipes. The drainage channels 710 are backfilled with sized stone 725, which may be of approximately 13 mm diameter. The drainage channels 710 and drainage pipes 720 are connected to a main drainage system (not shown) to facilitate egress/drainage of water therefrom. Above the compacted road base or compacted sized stone 705, is a compacted layer of fine sized compacted stone 730, which may be of approximately <7 mm. The compacted layer of fine sized compacted stone 730 may be bound with cement if desired, provided the structure remains appropriately water permeable and free draining. Above the compacted layer of fine sized compacted stone 730 is the underlay, for example scrim supported synthetic underlay sheet 401, although other suitable underlays could be used. Above the underlay is the synthetic turf sports flooring, which may for example be flexible synthetic turf 101, providing a playing surface 740, although other suitable synthetic turf sports flooring could be used. The sports ground structure 701 is suitably free draining, enabling rapid draining to evacuate water, which may be deposited onto the playing surface 740, for example by rain.

As set out above, the synthetic turf sports flooring and underlay in accordance with the present disclosure may be selected to assist in providing effective and rapid moisture evacuation, including liquid drainage properties, of sports ground structure 701. Underlay in accordance with the present disclosure can be engineered to provide similar performance properties to the synthetic turf sports flooring, which it supports, so that evacuation of moisture is fast and efficient. In particular, selection of the polymer fibres used, and optionally, blending fibres of different diameters within the layers, can provide products with good drainage characteristics.

When used outdoors, in for example (but not limited to) sports ground structure 701, synthetic turf sports flooring, and underlay if used, will normally be permanently installed. Hence a base foundation, for example as described above, will normally be pre-constructed ready for installation of the synthetic turf sports flooring (and underlay if used). A top surface of the pre-constructed foundation (for example top surface of the compacted layer of fine sized compacted stone 730) is normally levelled or cambered according to the requirements of the sporting activities to be played. The underlay, if required, is placed on the pre-constructed foundation surface and the synthetic turf sports flooring is placed on top of the underlay.

The synthetic turf sports flooring and underlay will typically be provided in rolls between 4 and 8 meters wide. When more than one width of underlay and/or synthetic turf sports flooring are required to cover the playing area, widths are joined together, for example by sewing, gluing, adhesive tape, thermo bonding or other methods as deemed suitable for particular application. The method used for joining the widths should avoid an undesirable degree of unevenness or irregularity, so that predictability of ball dynamics is achieved, and the joining method may be selected to avoid the use of adhesives or binders which may unduly affect playing characteristics of the performance surface.

It is to be understood that, if any prior art publication is referred to herein, such reference does not constitute an admission that the publication forms a part of the common general knowledge in the art, in Australia or any other country.

In the claims which follow and in the preceding description, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It will be understood to persons skilled in the art of the invention that many modifications may be made without departing from the spirit and scope of the invention.

The invention claimed is:

1. A synthetic turf sports flooring product suitable for use as a bowls surface, the product comprising a plurality of individual polymer fibres randomly entangled to provide a free draining sports surface layer, wherein substantially all of the polymer fibres of the sports surface layer are locked in position relative to the synthetic turf sports flooring product as a whole by the arrangement of fibres and contact between fibres in the synthetic turf sports flooring product and wherein the structural integrity of the synthetic turf sports flooring product is provided substantially entirely by the arrangement of fibres and contact between fibres in the synthetic turf sports flooring product.

2. A synthetic turf sports flooring product as claimed in claim 1, wherein the arrangement and contact of the fibres locks the fibres in position by mechanisms comprising physical entangling of the fibres, friction between fibres and/or inherent bonding of fibres.

3. A synthetic turf sports flooring product as claimed in claim 1 wherein at least some of the polymer fibres project outwardly of the sports surface layer and are arranged so that each provides at least one free end which projects outwardly of the sports surface layer and/or at least one loop portion which projects outwardly of the sports surface layer.

4. A synthetic turf sports flooring product as claimed in claim 1 wherein none of the polymer fibres of the sports surface layer are entangled with a scrim.

5. A synthetic turf sports flooring product as claimed in claim 1 wherein at least some of the polymer fibres are formed of a polymer with a glass transition temperature of at least 40 degrees centigrade.

6. A synthetic turf sports flooring product as claimed in claim 1 wherein the synthetic turf sports flooring product comprises a sports surface layer on each side of thereof.

7. A synthetic turf sports flooring product as claimed in claim 1 wherein the synthetic turf sports flooring product comprises one or more of layers of non-woven sheet material in addition to the sports surface layer.

8. A synthetic turf sports flooring product as claimed in claim 7 wherein the product comprises layers and different layers comprise one or more of: mass per unit area, polymer fibre length; polymer fibre cross sectional size; polymer fibre cross sectional shape; polymer fibre tenacity; polymer fibre crimp; proportions of polymer fibres of different polymer types; polymer fibre composition; resistance to ultraviolet radiation; colour; resilience; sheet orientation; thickness; degree of entanglement of the polymer fibres; use, or non-use, of one or more scrims.

9. A synthetic turf sports flooring product as claimed in claim 1, wherein the layers are mutually attached by entanglement of fibres of different layers.

10. A synthetic turf sports flooring product as claimed in claim 1 wherein the sports surface layer is used without in-fill.

11. A synthetic turf sports flooring product as claimed in claim 1 wherein the sports surface layer is configured with performance surface characteristics which correspond to those of one or more of: conventional bowls playing surfaces; conventional golf playing surfaces; conventional croquet playing surfaces; conventional hockey playing surfaces; conventional hoop-ball playing surfaces; conventional football playing surfaces; and conventional tennis playing surfaces.

12. A synthetic turf sports flooring product as claimed in claim 1 when used in conjunction with an underlay comprising an outer underlay layer having a side which provides a support surface for supporting synthetic turf upon which sports can be played, the outer underlay layer comprising a plurality of polymer fibres entangled to provide the support surface, wherein substantially all of the polymer fibres of the outer underlay layer are locked in position relative to the underlay as a whole by the arrangement of fibres and contact between fibres in the underlay.

13. A method of manufacturing a mat for synthetic turf sports flooring for use as a bowls playing surface, the method comprising manufacturing a performance surface layer having at least one side which provides a performance surface, the manufacture of the performance surface layer comprising:

providing a plurality of polymer fibres in a layer; and
treating the layer of polymer fibres using a fibre entangling process to provide a free-draining sheet of randomly entangled polymer fibres wherein substantially all of the individual polymer fibres of the performance surface layer are locked in position relative to the mat as a whole by the arrangement of fibres and contact between fibres in the mat and wherein the structural integrity of the synthetic turf sports flooring product is provided substantially entirely by the arrangement of fibres and contact between fibres.

14. A method as claimed in claim 13 further comprising the step of enhancing the degree to which polymer fibres of the performance surface layer are locked in position by heat treatment including applying heat by convection, by radiation and/or by conduction of heat from a treatment element.

15. A method as claimed in claim 13 comprising enhancing the degree to which polymer fibres of the performance surface layer are locked in position by application of pressure.

16. A method as claimed in claim 13 comprising enhancing the degree to which polymer fibres of the performance surface layer are locked in position by calendaring.

17. A method as claimed in claim 16 wherein the method further comprises forming a sheet, which step comprises attachment of the sheet of entangled polymer fibres to a scrim by forcing at least some of the polymer fibres through at least one layer of scrim.

18. A method as claimed claim 13 wherein the method comprises attachment of the performance surface layer to at least one supporting layer.

19. A sports field comprising a compacted stone or road base foundation with drainage channels therein, and a synthetic turf sports flooring in accordance with claim 1 overlaid on top of the foundation.

* * * * *